United States Patent [19]

Ausländer et al.

[11] Patent Number: 4,926,127
[45] Date of Patent: May 15, 1990

[54] APPARATUS FOR THE DETECTION OF METAL OBJECTS LOCATED WITHIN A POOR ELECTRICALLY CONDUCTIVE ENVIRONMENT

[75] Inventors: Klaus Ausländer, Reutlingen; Hans-Jürgen Fabris, Pfullingen; Wolfgang Patzwald, Reutlingen; Helmut Seichter, Pfullingen, all of Fed. Rep. of Germany

[73] Assignee: Institut Dr. Forster GmbH & Co. KG, Reutlingen, Fed. Rep. of Germany

[21] Appl. No.: 349,699

[22] Filed: May 10, 1989

Related U.S. Application Data

[63] Continuation of Ser. No. 33,205, Apr. 2, 1987, abandoned.

[30] Foreign Application Priority Data

Feb. 19, 1987 [DE] Fed. Rep. of Germany ....... 3705308

[51] Int. Cl.⁵ .......................... G01V 3/08; G01V 3/10
[52] U.S. Cl. ..................................... 324/329; 324/225
[58] Field of Search ............... 324/202, 225, 228, 326, 324/327, 328, 329

[56] References Cited

U.S. PATENT DOCUMENTS 2,779,908   1/1957   Martin ................................. 324/329
4,255,711   3/1981   Thompson ........................ 324/329
4,365,196  12/1982   Finch .................................. 324/202

Primary Examiner—Reinhard J. Eisenzopf
Assistant Examiner—Walter E. Snow
Attorney, Agent, or Firm—George J. Netter

[57] ABSTRACT

A wire loop of almost negligible inductance is coupled with the excitation and receiver coils of metal object detection apparatus which is opened and closed to produce signals in phase with noise signals produced by poorly conductive soils. Enhanced suppression of noise signals is achieved.

2 Claims, 1 Drawing Sheet

APPARATUS FOR THE DETECTION OF METAL OBJECTS LOCATED WITHIN A POOR ELECTRICALLY CONDUCTIVE ENVIRONMENT

This is a continuation of application Ser. No. 07/033,205, filed Apr. 2, 1987, now abandoned.

The present invention relates generally to an inductive search apparatus, and more particularly to such search apparatus for detection of metal objects.

BACKGROUND OF THE INVENTION

Search apparatus have been known for some time in various forms and constructions. Such apparatus serves in general for the detection and discovery of metal objects which are hidden underground. These operate generally on the principle that an alternating magnetic field from a search coil on embracing the metal objects induce eddy currents in the objects which currents build up a counterfield that acts upon the search coil. It is this reaction which produces signals in the receiver winding that are evaluated and provide an indication. The signals indicate corresponding to the physical characteristics of the object from which they are set in action, the characteristic differences existing especially in the phase relation. Therefore, phase relationship is often used for the classification of the kinds of discovered objects. Accordingly, the possession of a reference phase angle which is fixed with respect to the phase of the signals of sought objects can be of great importance.

Often, the useful signals are covered over by noise (disturbance) signals which can be greater than the signals of the sought after objects. In this instance, of particular importance is the soil which surrounds the sought after objects. On one hand, this soil can contain mineral components, which possess a magnetic permeability greater than 1. One refers to magnetizable soils which generate an alternating magnetic flow through the search coil and which produces a signal in the coil. On the other hand, salt water can, specifically on beaches, be the media which surround the sought after objects. In this connection, we are speaking of weak electrically conductive media acting on the search coil. The described soil effects, interestingly, result in noise signals which in a definite frequency range stand at 90 degrees to one another, and, in fact, the signals from magnetizable soils fall in the 90 degree direction and signals of electrically weak conductive media almost in the zero direction to the impedance plane. These stand in a fixed phase relationship to the signals of different search objects. This circumstance can be used in order to separate useful and noise signals from one another and to suppress the effect of noise signals on the search result. Crucial to the operability of such a disturbance signal suppression in after connected electronics is that there be provided a reference phase angle fixed in relation to the phase base of the noise signals and which is particularly not changed by phase drift in the energizing and receiving coils or in the evaluation electronics.

OBJECT AND SUMMARY OF THE INVENTION

In accordance with the practice of the subject invention there is provided search apparatus which, at the outset, is outfitted with a reference phase angle source whose phase angle is fixedly related with the phase base of the signals which are produced in a search coil by the sought objects and/or by the surrounding disturbing media. According to one embodiment, the detection apparatus has a conducting wire loop with almost negligible inductance brought near to the detection coil.

In this way a reference phase angle is produced, which lies very exactly in the zero degree direction of the impedance plane, and thus in the direction which signals produced by poor electrically conductive soils lie. A good separation of reference signals from all mixed in signals becomes possible through a practical construction of the apparatus in which a switch is provided in a conductive loop. According to one form of the invention one receives an especially good possibility for separating signals through periodic switching on and off of the conductive loop.

DESCRIPTION OF PREFERRED EMBODIMENTS

Figure 1:
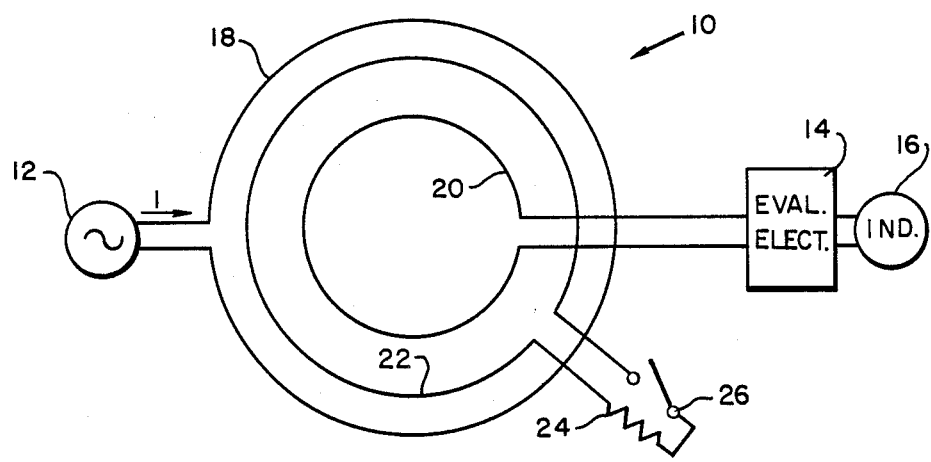
FIG. 1 is a circuit schematic of an inductive search apparatus with conductive loop in accordance with the present invention.

The detection apparatus according to FIG. 1, consists of a detection coil 10, alternating current source 12, evaluation electronics 14 and an indicator 16. The detection coil possesses an excitation winding 18, which is connected to the output of the A.C. current source 12 and a receiver winding 20 which is fed into the input of the evaluation electronics 14. Means for compensating the continuous signal that the excitation winding 18 induces in the receiving winding 20, are in the case in question without relevance and therefore not illustrated. Such means, which are well-known to those skilled in the art, can include, for example, a special compensation winding or a differencing arrangement of the receiving winding (see FIG. 3), which can, however, also be only completely of the electronic variety and form a part of the evaluation electronics. In the foregoing example, the excitation winding 18 and the receiving winding 20 should lie in a single plane. Both can, in a known manner, possess a plurality of windings.

A conductive loop 22 is arranged approximately in the middle between both windings, the preferred form only exhibiting one winding. The loop can be constructed by using a resistance wire or it can be connected to a resistance 24. In each case, its collective ohmic resistance should possess a value, which is large with respect to the value of the inductive reactance $2\pi fL$ of the conductive loop where the given frequency f is that of the A.C. current J in the excitation winding 18. There is provided a switch 26 in the current circuit of the conductive loop 22, with whose help the conductive loop can be cut out. By operation of the switch 26 the magnetic flow of the excitation current J induces a short circuit current in the conductive loop, which on its part results in an additional magnetic flux through the receiving coil 20. Accordingly, the induced voltage in the latter because of these conditions has a phase angle which falls almost exactly in the 0 direction of the impedance plane. The induced voltage circulates through all members of the evaluation electronics 14 involved with a phase drift, in the same manner as use and noise signals to be evaluated in those members. The phase basis of this voltage can consequently be used as reference phase angle in any way you choose for the continuing processing of the use signals or for the separation of the use signals from the disturbance signal.

Figure 2:
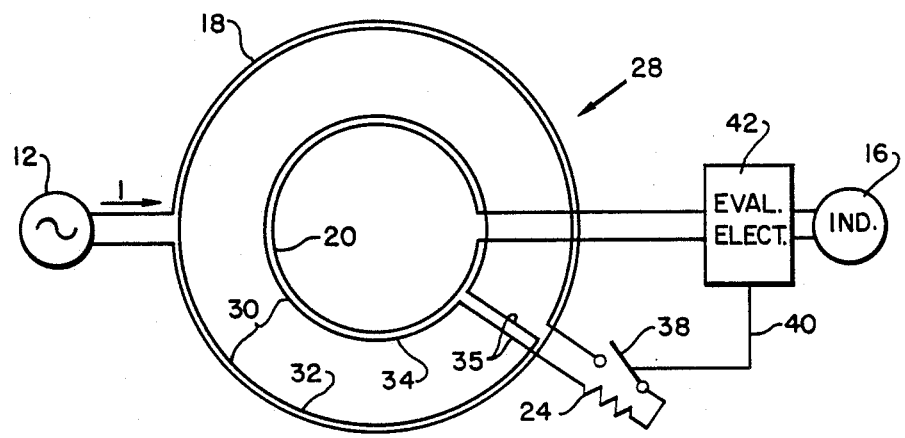
FIG. 2 is a further search schematic shown with two part loops.

In FIG. 2 there is shown a further form of detection apparatus similar to FIG. 1. The same parts are provided with the same numerals. The detection coil 28 is outfitted with a modified conductive loop 30. This possesses two component loops 32, 34 with different diameters, which are connected together by conductors and which thereby form a single winding. The component loop 32 is especially tightly coupled with the excitation winding 19, in that it is located very close to the winding where the density of the excitation field lines is very large. In similar manner, the component loop 34 is especially tightly coupled with the receiving winding 20, by bringing it into direct proximity to the latter. The object of this is to retain the reference phase angle as wide as possible free from foreign influence and to gain voltage sufficiently high above the noise level. A reference phase angle which is not zero would mean that the conductive loop 30 possesses a non-negligible self-inductance.

On the detection coil 10 nearing a medium with magnetic permeability differing from one, so-called magnetizable soil, the self-inductance of the conductive loop 30 would change markedly. This would result, however, in an uncontrollable rotation of the reference phase angle from outside sources. In order to hold the foreign influences on the phase small, the resistance must be maintained as large as possible with respect to an unavoidable self-inductance. On the other hand, there will be brought about thereby a small voltage from the conductive loop 30 in the receiving coil 20. To counteract this, the coupling between the conductive loop 30 and the excitation winding 18 on the one hand, and the conductive loop 30 and the receiving winding 20, on the other hand, ought to be as fixed as possible, for as strong as the coupling of the conductive loop 30 is to the excitation winding 18, the larger the induced current in the conductive loop, and the stronger the coupling to the receiving coil 20, the greater the induced voltage.

Amplification of the coupling through increasing the number of loop conductor turns is eliminated because self-inductance of the conductive loop is dependent upon the square of the number of turns, while the mutual inductance of the conductive loop to the excitation winding and to the receiving winding would only be linearly dependent upon the number of turns. The conclusion of this consists in that one can undertake in the above described manner a splitting up of the conductor loop 30 into two component loops 32 and 34, with each through close arrangement and accommodating the geometric form, on the one hand has a fixed coupling to the excitation winding 18 and, on the other hand, to the receiving winding 20.

The search apparatus according to FIG. 2 distinguishes in one respect from FIG. 1. The switch 38 provided in the current circuit for the conductive loop 30 is an electronic switch, which can be actuated over a control lead 40. Evaluation electronics 42 with indication means corresponds to the electronics 14 and indication means 16 of FIG. 1 and additionally possesses a control circuit which by control lead wire 40 periodically opens and closes a switch 38 at control frequency $f_{st}$. In this manner, the signal representing the phase reference angle is available with a modulation at the controlling frequency $f_{st}$, and can be separated easily from other mixed in signals. It could happen, for example, throughout a band-pass whose middle frequency is tuned to the controlling frequency $f_{st}$.

Figure 3:
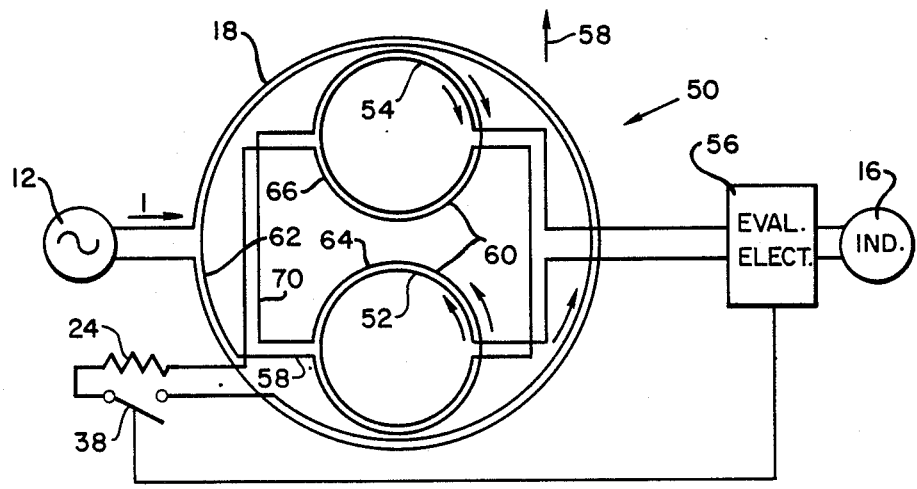
FIG. 3 is another schematic showing the use of three part loops.

The search apparatus in FIG. 3 possesses a search coil 50 with two receiving windings 52 and 54 interconnected in subtractive arrangement. The remainder is connected as in the FIG. 2 detection apparatus and the same components use the same reference numerals. Both of the receiving windings 52 and 54 are connected together in a counterwound sense and connected to the entrance of the evaluation electronics 56.

Due to the symmetrical construction of excitation winding 18 to the receiving windings 52 and 54, the induced signals in the receiving windings are suppressed at the entrance to the evaluation electronics 56. This is not true for signals which are brought about by the reaction from metal objects, over which the search coil 50 is moved in the direction of the arrow 58. Because these signals are effective at different times in the two receiving windings 52, 54, they are indicated in a well known manner.

For such a coil arrangement as provided according to FIG. 3, a conductive loop 60 consists of three component loops 62, 64, 66. Component loop 62 is adjusted to the form of the excitation winding 18 and brought into the immediate neighborhood thereof. The component loops 64 and 66 are also adjusted to the form of the receiving windings 52 and 54 and brought into their immediate neighborhood. The loops 62, 64, 66 are connected together through lead wires 68 and 70.

In order that the induced phase reference signals in the receiving windings 52 and 54 shall not cancel one another, the polarity of the wire loops 64 and 66 must be carried out according to the winding sense of the receiver windings 52 and 54. This occurs through a corresponding connection of the wire bridge 70 with whose help a counterpolarity of both of the component loops 64, 62 is achieved.

I claim:

1. Inductive search apparatus for the detection of metal objects located within an environment presenting poor conductor background disturbance having a search coil with excitation and receiver windings, the excitation coil being connected to an A.C. current source from which A.C. current is fed to the excitation coil to build up a penetrating magnetic field for thoroughly searching a region, metal objects contacted by the magnetic field producing signals in the receiver winding, and the receiver coil being connected to evaluation electronics via which the signals are evaluated and indicated, comprising:

a single wire loop in the magnetic effective range of the search coil having an ohmic resistance which is large with respect to its inductive reactance, said loop including a first component loop tightly coupled with the excitation coil and a second component loop tightly coupled with the receiver coil, said first and second component loops being serially interconnected; and selectively actuatable switch means via which the wire loop can be closed which interacts with the search coil to eliminate background disturbances of a poor conductor character.

2. Inductive search apparatus for the detection of metal objects located within an environment presenting poor electrical conductor background disturbance having a search coil with excitation and receiver windings, the excitation coil being connected to an A.C. current source from which A.C. current is fed to the excitation coil to build up a penetrating magnetic field for thoroughly searching a region, metal objects contacted by the magnetic field producing signals in the receiver winding, and the receiver coil being connected to evaluation electronics via which the signal sare evaluated and indicated, comprising:
  a single wire loop in the magnetic effective range of the search coil having an ohmic resistance which is large with respect to its inductive reactance, and selectively actuatable switch means via which the wire loop can be closed which interacts with the search coil to eliminate background disturbances of a poor conductor character;
  said receiver winding including first and second windings serially connected in differencing arrangement, first and second component loops tightly coupled respectively to said receiver first and second windings, and a third component loop closely coupled to the excitation winding.

* * * * *